United States Patent
Zhang et al.

(10) Patent No.: US 10,010,907 B2
(45) Date of Patent: Jul. 3, 2018

(54) METHOD FOR COLOR REGISTER SPRAYING OF HUB

(71) Applicant: CITIC Dicastal CO., LTD, Qinhuangdao (CN)

(72) Inventors: Le Zhang, Qinhuangdao (CN); Shengchao Zhang, Qinhuangdao (CN); Yongning Wang, Qinhuangdao (CN); Zhihua Zhu, Qinhuangdao (CN); Changhai Li, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 115 days.

(21) Appl. No.: 15/189,129

(22) Filed: Jun. 22, 2016

(65) Prior Publication Data

US 2017/0016106 A1   Jan. 19, 2017

(30) Foreign Application Priority Data

Jul. 16, 2015   (CN) .......................... 2015 1 0418481

(51) Int. Cl.
| | |
|---|---|
| *B05D 1/04* | (2006.01) |
| *C23C 4/18* | (2006.01) |
| *B05D 7/00* | (2006.01) |
| *B05D 1/00* | (2006.01) |
| *B60B 21/00* | (2006.01) |

(52) U.S. Cl.
CPC .............. *B05D 1/04* (2013.01); *B05D 1/002* (2013.01); *B05D 7/53* (2013.01); *B60B 21/00* (2013.01); *C23C 4/18* (2013.01); *B05D 2202/25* (2013.01)

(58) Field of Classification Search
None
See application file for complete search history.

(56) References Cited

U.S. PATENT DOCUMENTS

2007/0255015 A1\*  11/2007  Kato ................... C08G 59/226
                                                              525/524

OTHER PUBLICATIONS

Machine Finish vs. Painted Wheels; available at http://www.wheelkraftnw.com/machine-finish-vs-painted-wheels; Published Feb. 27, 2014.\*

\* cited by examiner

*Primary Examiner* — Michael P Rodriguez
(74) *Attorney, Agent, or Firm* — Maier & Maier, PLLC

(57) ABSTRACT

The present invention provides a method for color register spraying of a hub, which includes machining and turning for glossy finish after spraying a black paint on the surface of a hub, and then spraying a color transparent paint onto the hub. The method provided by the invention achieves a spraying-based color register effect through spraying of the color transparent paint, which greatly improves the production efficiency and is available for batch production.

3 Claims, No Drawings

METHOD FOR COLOR REGISTER SPRAYING OF HUB

TECHNICAL FIELD

The present invention relates to the field of automobile parts, and in particular to a method for color register spraying of a hub.

BACKGROUND ART

At present, the hub is relatively simple in terms of color. The color register technology in the prior art is mainly realized through protection, but with the problems of unclear color register edge, requirement for partial patching through manual operation, lower finished product ratio, higher labor cost and the like, which is not applicable to mass production.

SUMMARY OF THE INVENTION

Therefore, an object of the present invention is to provide a hub printing method with the advantages of simple and convenient technology and clear color register edge.

In one aspect of the present invention, a method for color register spraying of a hub is provided, which is characterized by comprising machining and turning for glossy finish after spraying a black paint on the surface of a hub, and then spraying a color transparent paint onto the hub.

In one preferred aspect of the present invention, the method comprises the following steps: preprocessing, baking, spraying of priming powder, curing, spraying of a black paint, curing, machining and turning for glossy finish, preprocessing, baking, spraying of transparent powder, curing, spraying of a color transparent paint, and curing.

In one preferred aspect of the present invention, the method is performed by adopting one or more of the following working conditions: (1) in the step of spraying of the priming powder, an electrostatic spray gun is used for spraying, with a voltage controlled to be 60 KV to 80 KV and a powder output controlled to be 10 g/s to 15 g/s, thereby guaranteeing excellent inter-coating adhesion; (2) in the step of curing of the priming powder, the surface temperature of a workpiece is controlled to be 180° C. for 8 to 12 min, thereby allowing the powder to maintain certain flexibility and better inter-coating adhesion; (3) in the step of spraying of the black paint, an air spray gun is used for spraying, with an air output controlled to be 50 cc/min to 100 cc/min and a sector atomization pressure being 2 bar to 3 bar, thereby guaranteeing the black paint to be sprayed onto the surface of the hub evenly and fully; (4) in the step of curing of the black paint, the temperature of the workpiece is controlled to be 150° C. for 10 min to 15 min, thereby allowing the black paint to possess better flexibility and inter-coating adhesion; (5) in the step of machining and turning for glossy finish, a rotation speed S is controlled to be 1200 rpm, with a feed rate F controlled to be 0.2 mm/r; (6) in the step of spraying of the transparent powder, the electrostatic spray gun is used for spraying, with a voltage controlled to be 60 KV to 80 KV and a powder output controlled to be 10 g/s to 15 g/s, thereby guaranteeing excellent inter-coating adhesion; (7) in the step of curing of the transparent powder, the surface temperature of the workpiece is controlled to be 177° C. for 10 to 15 min, thereby allowing the powder to maintain certain flexibility and better inter-coating adhesion; (8) in the step of spraying of the color transparent paint, a rotating-cup spray gun is used for spraying, with a rotation speed being 25000 R/min, a forming air pressure being 2 bar to 3 bar and a paint spraying pressure being 4 bar to 5 bar, thereby guaranteeing the color transparent paint to be sprayed onto the surface of the hub evenly and fully; and (9) in the step of curing of the color transparent paint, the temperature of the workpiece is controlled to be 150° C. for 10 min to 15 min, thereby allowing the color transparent paint to possess better flexibility and inter-coating adhesion.

In one preferred aspect of the present invention, in the step of spraying of the priming powder, the electrostatic spray gun is used for spraying, with the voltage controlled to be 60 KV and the powder output controlled to be 10 g/s, thereby guaranteeing excellent inter-coating adhesion; in the step of curing of the priming powder, the surface temperature of the workpiece is controlled to be 180° C. for 8 min, thereby allowing the powder to maintain certain flexibility and better inter-coating adhesion; in the step of spraying of the black paint, the air spray gun is used for spraying, with the air output controlled to be 50 cc/min and the sector atomization pressure being 2 bar, thereby guaranteeing the black paint to be sprayed onto the surface of the hub evenly and fully; in the step of curing of the black paint, the temperature of the workpiece is controlled to be 150° C. for 10 min, thereby allowing the black paint to possess better flexibility and inter-coating adhesion; in the step of machining and turning for glossy finish, the rotation speed S is controlled to be 1200 rpm, with the feed rate F controlled to be 0.2 mm/r; in the step of spraying of the transparent powder, the electrostatic spray gun is used for spraying, with the voltage controlled to be 60 KV and the powder output controlled to be 10 g/s, thereby guaranteeing excellent inter-coating adhesion; in the step of curing of the transparent powder, the surface temperature of the workpiece is controlled to be 177° C. for 8 min, thereby allowing the powder to maintain certain flexibility and better inter-coating adhesion; in the step of spraying of the color transparent paint, the rotating-cup spray gun is used for spraying, with the rotation speed being 25000 R/min; and in the step of curing of the color transparent paint, the temperature of the workpiece is controlled to be 150° C. for 10 min, thereby allowing the color transparent paint to possess better flexibility and inter-coating adhesion.

In one preferred aspect of the present invention, in the step of spraying of the priming powder, the electrostatic spray gun is used for spraying, with the voltage controlled to be 70 KV and the powder output controlled to be 12 g/s, thereby guaranteeing excellent inter-coating adhesion; in the step of curing of the priming powder, the surface temperature of the workpiece is controlled to be 180° C. for 10 min, thereby allowing the powder to maintain certain flexibility and better inter-coating adhesion; in the step of spraying of the black paint, the air spray gun is used for spraying, with the air output controlled to be 80 cc/min and the sector atomization pressure being 2.5 bar, thereby guaranteeing the black paint to be sprayed onto the surface of the hub evenly and fully; in the step of curing of the black paint, the temperature of the workpiece is controlled to be 150° C. for 12 min, thereby allowing the black paint to possess better flexibility and inter-coating adhesion; in the step of machining and turning for glossy finish, the rotation speed S is controlled to be 1200 rpm, with the feed rate F controlled to be 0.2 mm/r; in the step of spraying of the transparent powder, the electrostatic spray gun is used for spraying, with the voltage controlled to be 70 KV and the powder output controlled to be 12 g/s, thereby guaranteeing excellent inter-coating adhesion; in the step of curing of the priming powder, the surface temperature of the workpiece is controlled to be 177° C. for 12 min, thereby allowing the powder to maintain certain flexibility and better inter-coating adhesion; in the step of spraying of the color transparent paint, a rotating-cup spray gun is used for spraying, with the rotation speed being 25000 R/min, the forming air pressure being 2.5 bar, and the paint spraying pressure being 4.5 bar, thereby guaranteeing the color transparent paint to be sprayed onto the surface of the hub evenly and fully; and in the step of curing of the color transparent paint, the temperature of the workpiece is controlled to be 150° C. for 12 min, thereby allowing the color transparent paint to possess better flexibility and inter-coating adhesion.

In one preferred aspect of the present invention, in the step of spraying of the priming powder, the electrostatic spray gun is used for spraying, with the voltage controlled to be 80 KV and the powder output controlled to be 15 g/s, thereby guaranteeing excellent inter-coating adhesion; in the step of curing of the priming powder, the surface temperature of a workpiece is controlled to be 180° C. for 12 min, thereby allowing the powder to maintain certain flexibility and better inter-coating adhesion; in the step of spraying of the black paint, the air spray gun is used for spraying, with the air output controlled to be 100 cc/min and the sector atomization pressure being 3 bar, thereby guaranteeing the black paint to be sprayed onto the surface of the hub evenly and fully; in the step of curing of the black paint, the temperature of the workpiece is controlled to be 150° C. for 15 min, thereby allowing the black paint to possess better flexibility and inter-coating adhesion; in the step of machining and turning for glossy finish, the rotation speed S is controlled to be 1200 rpm, with the feed rate F controlled to be 0.2 mm/r; in the step of spraying of the transparent powder, the electrostatic spray gun is used for spraying, with the voltage controlled to be 80 KV and the powder output controlled to be 15 g/s, thereby guaranteeing excellent inter-coating adhesion; in the step of curing of the transparent powder, the surface temperature of a workpiece is controlled to be 177° C. for 15 min, thereby allowing the powder to maintain certain flexibility and better inter-coating adhesion; in the step of spraying of the color transparent paint, a rotating-cup spray gun is used for spraying, with the rotation speed being 25000 R/min, the forming air pressure being 3 bar, and the paint spraying pressure being 5 bar, thereby guaranteeing the color transparent paint to be sprayed onto the surface of the hub evenly and fully; and in the step of curing of the color transparent paint, the temperature of the workpiece is controlled to be 150° C. for 15 min, thereby allowing the color transparent paint to possess better flexibility and inter-coating adhesion.

In other aspects of the present invention, a technical solution is also disclosed as follows:

in order to overcome the defects of the technology for color register of the hub, the present invention provides a novel technology for color register spraying of the hub.

The method provided by the present invention comprises the specific technological process as follows: preprocessing, baking, spraying of priming powder, curing, spraying of a black paint, curing, machining and turning for glossy finish, preprocessing, baking, spraying of transparent powder, curing, spraying of a color transparent paint, and curing.

In the step of spraying of the priming powder, an electrostatic spray gun is used for spraying, with a voltage controlled to be 60 KV to 80 KV and a powder output controlled to be 10 g/s to 15 g/s, thereby guaranteeing excellent inter-coating adhesion.

In the step of curing of the priming powder, the surface temperature of a workpiece is controlled to be 180° C. for 8 min to 12 min, thereby allowing the powder to maintain certain flexibility and better inter-coating adhesion.

In the step of spraying of the black paint, an air spray gun is used for spraying, with an air output controlled to be 50 cc/min to 100 cc/min and a sector atomization pressure being 2 bar to 3 bar, thereby guaranteeing the black paint to be sprayed onto the surface of the hub evenly and fully.

In the step of curing of the black paint, the temperature of the workpiece is controlled to be 150° C. for 10 min to 15 min, thereby allowing the black paint to possess better flexibility and inter-coating adhesion.

In the step of machining and turning for glossy finish, a rotation speed S is controlled to be 1200 rpm, with a feed rate F controlled to be 0.2 mm/r.

In the step of spraying of the transparent powder, the electrostatic spray gun is used for spraying, with a voltage controlled to be 60 KV to 80 KV and a powder output controlled to be 10 g/s to 15 g/s, thereby guaranteeing excellent inter-coating adhesion.

In the step of curing of the transparent powder, the surface temperature of a workpiece is controlled to be 177° C. for 10 min to 15 min, thereby allowing the powder to maintain certain flexibility and better inter-coating adhesion.

In the step of spraying of the color transparent paint, a rotating-cup spray gun is used for spraying, with a rotation speed being 25000 R/min, a forming air pressure being 2 bar to 3 bar, and a paint spraying pressure being 4 bar to 5 bar, thereby guaranteeing the color transparent paint to be sprayed onto the surface of the hub evenly and fully.

In the step of curing of the color transparent paint, the temperature of the workpiece is controlled to be 150° C. for 10 min to 15 min, thereby allowing the color transparent paint to possess better flexibility and inter-coating adhesion.

The method provided by the invention achieves a spraying-based color register effect through spraying of the color transparent paint, which greatly improves the production efficiency and is available for batch production.

In a preferred aspect, in the step of spraying of the priming powder, the electrostatic spray gun is used for spraying, with the voltage controlled to be 60 KV and the powder output controlled to be 10 g/s, thereby guaranteeing excellent inter-coating adhesion. In the step of curing of the priming powder, the surface temperature of a workpiece is controlled to be 180° C. for 8 min, thereby allowing the powder to maintain certain flexibility and better inter-coating adhesion. In the step of spraying of the black paint, the air spray gun is used for spraying, with the air output controlled to be 50 cc/min and the sector atomization pressure being 2 bar, thereby guaranteeing the black paint to be sprayed onto the surface of the hub evenly and fully. In the step of curing of the black paint, the temperature of the workpiece is controlled to be 150° C. for 10 min, thereby allowing the black paint to possess better flexibility and inter-coating adhesion. In the step of machining and turning for glossy finish, the rotation speed S is controlled to be 1200 rpm, with the feed rate F controlled to be 0.2 mm/r. In the step of spraying of the transparent powder, the electrostatic spray gun is used for spraying, with the voltage controlled to be 60 KV and the powder output controlled to be 10 g/s, thereby guaranteeing excellent inter-coating adhesion. In the step of curing of the transparent powder, the surface temperature of the workpiece is controlled to be 177° C. for 8 min, thereby allowing the powder to maintain certain flexibility and better inter-coating adhesion. In the step of spraying of the color transparent paint, the rotating-cup spray gun is used for spraying, with the rotation speed being 25000 R/min, the forming air pressure being 2 bar and the paint spraying pressure being 4 bar, thereby guaranteeing the color transparent paint to be sprayed onto the surface of the hub evenly and fully. In the step of curing of the color transparent paint, the temperature of the workpiece is controlled to be 150° C. for 10 min, thereby allowing the color transparent paint to possess better flexibility and inter-coating adhesion.

In a preferred aspect of the present invention, in the step of spraying of the priming powder, the electrostatic spray gun is used for spraying, with the voltage controlled to be 70 KV and the powder output controlled to be 12 g/s, thereby guaranteeing excellent inter-coating adhesion. In the step of curing of the priming powder, the surface temperature of the workpiece is controlled to be 180° C. for 10 min, thereby allowing the powder to maintain certain flexibility and better inter-coating adhesion. In the step of spraying of the black paint, the air spray gun is used for spraying, with the air output controlled to be 80 cc/min and the sector atomization pressure being 2.5 bar, thereby guaranteeing the black paint to be sprayed onto the surface of the hub evenly and fully. In the step of curing of the black paint, the temperature of the workpiece is controlled to be 150° C. for 12 min, thereby allowing the black paint to possess better flexibility and inter-coating adhesion. In the step of machining and turning for glossy finish, the rotation speed S is controlled to be 1200 rpm, with the feed rate F controlled to be 0.2 mm/r. In the step of spraying of the transparent powder, the electrostatic spray gun is used for spraying, with the voltage controlled to be 70 KV and the powder output controlled to be 12 g/s, thereby guaranteeing excellent inter-coating adhesion. In the step of curing of the transparent powder, the surface temperature of a workpiece is controlled to be 177° C. for 12 min, thereby allowing the powder to maintain certain flexibility and better inter-coating adhesion. In the step of spraying of the color transparent paint, the rotating-cup spray gun is used for spraying, with the rotation speed being 25000 R/min, the forming air pressure being 2.5 bar and the paint spraying pressure being 4.5 bar, thereby guaranteeing the color transparent paint to be sprayed onto the surface of the hub evenly and fully. In the step of curing of the color transparent paint, the temperature of the workpiece is controlled to be 150° C. for 12 min, thereby allowing the color transparent paint to possess better flexibility and inter-coating adhesion.

In a preferred aspect of the present invention, in the step of spraying of the priming powder, an electrostatic spray gun is used for spraying, with the voltage controlled to be 80 KV and the powder output controlled to be 15 g/s, thereby guaranteeing excellent inter-coating adhesion. In the step of curing of the priming powder, the surface temperature of a workpiece is controlled to be 180° C. for 12 min, thereby allowing the powder to maintain certain flexibility and better inter-coating adhesion. In the step of spraying of the black paint, an air spray gun is used for spraying, with the air output controlled to be 100 cc/min and the sector atomization pressure being 3 bar, thereby guaranteeing the black paint to be sprayed onto the surface of the hub evenly and fully. In the step of curing of the black paint, the temperature of the workpiece is controlled to be 150° C. for 15 min, thereby allowing the black paint to possess better flexibility and inter-coating adhesion. In the step of machining and turning for glossy finish, the rotation speed S is controlled to be 1200 rpm, with the feed rate F controlled to be 0.2 mm/r. In the step of spraying of the transparent powder, the electrostatic spray gun is used for spraying, with the voltage controlled to be 80 KV and the powder output controlled to be 15 g/s, thereby guaranteeing excellent inter-coating adhesion. In the step of curing of the transparent powder, the surface temperature of a workpiece is controlled to be 177° C. for 15 min, thereby allowing the powder to maintain certain flexibility and better inter-coating adhesion. In the step of spraying of the color transparent paint, a rotating-cup spray gun is used for spraying, with the rotation speed being 25000 R/min, the forming air pressure being 3 bar and the paint spraying pressure being 5 bar, thereby guaranteeing the color transparent paint to be sprayed onto the surface of the hub evenly and fully. In the step of curing of the color transparent paint, the temperature of the workpiece is controlled to be 150° C. for 15 min, thereby allowing the color transparent paint to possess better flexibility and inter-coating adhesion.

The method provided by the invention achieves a spraying-based color register effect through spraying of the color transparent paint, which greatly improves the production efficiency and is available for batch production.

DETAILED DESCRIPTION OF THE INVENTION

Embodiment 1

A technology for spraying-based color register with a color transparent paint comprises the specific technological process as follows: preprocessing, baking, spraying of priming powder, curing, spraying of a black paint, curing, machining and turning for glossy finish, preprocessing, baking, spraying of transparent powder, curing, spraying of a color transparent paint, and curing.

In the step of spraying of the priming powder, an electrostatic spray gun is used for spraying, with a voltage controlled to be 60 KV and a powder output controlled to be 10 g/s, thereby guaranteeing excellent inter-coating adhesion.

In the step of curing of the priming powder, the surface temperature of a workpiece is controlled to be 180° C. for 8 min, thereby allowing the powder to maintain certain flexibility and better inter-coating adhesion.

In the step of spraying of the black paint, an air spray gun is used for spraying, with an air output controlled to be 50 cc/min and a sector atomization pressure being 2 bar, thereby guaranteeing the black paint to be sprayed onto the surface of the hub evenly and fully.

In the step of curing of the black paint, the temperature of a workpiece is controlled to be 150° C. for 10 min, thereby allowing the black paint to possess better flexibility and inter-coating adhesion.

In the step of machining and turning for glossy finish, a rotation speed S is controlled to be 1200 rpm, with a feed rate F controlled to be 0.2 mm/r.

In the step of spraying of the transparent powder, the electrostatic spray gun is used for spraying, with a voltage controlled to be 60 KV and a powder output controlled to be 10 g/s, thereby guaranteeing excellent inter-coating adhesion.

In the step of curing of the transparent powder, the surface temperature of a workpiece is controlled to be 177° C. for 8 min, thereby allowing the powder to maintain certain flexibility and better inter-coating adhesion.

In the step of spraying of the color transparent paint, a rotating-cup spray gun is used for spraying, with a rotation speed being 25000 R/min.

In the step of curing of the color transparent paint, the temperature of the workpiece is controlled to be 150° C. for 10 min, thereby allowing the color transparent paint to possess better flexibility and inter-coating adhesion.

Embodiment 2

A technology for spraying-based color register with a color transparent paint comprises the specific technological process as follows: preprocessing, baking, spraying of priming powder, curing, spraying of a black paint, curing, machining and turning for glossy finish, preprocessing, baking, spraying of transparent powder, curing, spraying of a color transparent paint, and curing.

In the step of spraying of the priming powder, an electrostatic spray gun is used for spraying, with a voltage controlled to be 70 KV and a powder output controlled to be 12 g/s, thereby guaranteeing excellent inter-coating adhesion.

In the step of curing of the priming powder, the surface temperature of a workpiece is controlled to be 180° C. for 10 min, thereby allowing the powder to maintain certain flexibility and better inter-coating adhesion.

In the step of spraying of the black paint, the air spray gun is used for spraying, with an air output controlled to be 80 cc/min and a sector atomization pressure being 2.5 bar, thereby guaranteeing the black paint to be sprayed onto the surface of the hub evenly and fully.

In the step of curing of the black paint, the temperature of the workpiece is controlled to be 150° C. for 12 min, thereby allowing the black paint to possess better flexibility and inter-coating adhesion.

In the step of machining and turning for glossy finish, a rotation speed S is controlled to be 1200 rpm, with a feed rate F controlled to be 0.2 mm/r.

In the step of spraying of the transparent powder, the electrostatic spray gun is used for spraying, with a voltage controlled to be 70 KV and a powder output controlled to be 12 g/s, thereby guaranteeing excellent inter-coating adhesion.

In the step of curing of the transparent powder, the surface temperature of a workpiece is controlled to be 177° C. for 12 min, thereby allowing the powder to maintain certain flexibility and better inter-coating adhesion.

In the step of spraying of the color transparent paint, a rotating-cup spray gun is used for spraying, with a rotation speed being 25000 R/min, a forming air pressure being 2.5 bar and a paint spraying pressure being 4.5 bar, thereby guaranteeing the color transparent paint to be sprayed onto the surface of the hub evenly and fully.

In the step of curing of the color transparent paint, the temperature of the workpiece is controlled to be 150° C. for 12 min, thereby allowing the color transparent paint to possess better flexibility and inter-coating adhesion.

Embodiment 3

A technology for spraying-based color register with a color transparent paint comprises the specific technological process as follows: preprocessing, baking, spraying of priming powder, curing, spraying of a black paint, curing, machining and turning for glossy finish, preprocessing, baking, spraying of transparent powder, curing, spraying of a color transparent paint, and curing.

In the step of spraying of the priming powder, an electrostatic spray gun is used for spraying, with a voltage controlled to be 80 KV and a powder output controlled to be 15 g/s, thereby guaranteeing excellent inter-coating adhesion.

In the step of curing of the priming powder, the surface temperature of a workpiece is controlled to be 180° C. for 12 min, thereby allowing the powder to maintain certain flexibility and better inter-coating adhesion.

In the step of spraying of the black paint, an air spray gun is used for spraying, with an air output controlled to be 100 cc/min and a sector atomization pressure being 3 bar, thereby guaranteeing the black paint to be sprayed onto the surface of the hub evenly and fully.

In the step of curing of the black paint, the temperature of the workpiece is controlled to be 150° C. for 15 min, thereby allowing the black paint to possess better flexibility and inter-coating adhesion.

In the step of machining and turning for glossy finish, a rotation speed S is controlled to be 1200 rpm, with a feed rate F controlled to be 0.2 mm/r.

In the step of spraying of the transparent powder, the electrostatic spray gun is used for spraying, with a voltage controlled to be 80 KV and a powder output controlled to be 15 g/s, thereby guaranteeing excellent inter-coating adhesion.

In the step of curing of the transparent powder, the surface temperature of a workpiece is controlled to be 177° C. for 15 min, thereby allowing the powder to maintain certain flexibility and better inter-coating adhesion.

In the step of spraying of the color transparent paint, a rotating-cup spray gun is used for spraying, with a rotation speed being 25000 R/min, a forming air pressure being 3 bar and a paint spraying pressure being 5 bar, thereby guaranteeing the color transparent paint to be sprayed onto the surface of the hub evenly and fully.

In the step of curing of the color transparent paint, the temperature of the workpiece is controlled to be 150° C. for 15 min, thereby allowing the color transparent paint to possess better flexibility and inter-coating adhesion.

The invention claimed is:

1. A method for color register spraying of a hub, comprising the steps of: preprocessing, baking, spraying of priming powder on a surface of the hub, curing, spraying of a black paint, curing, machining and turning for glossy finish, preprocessing, baking, spraying of transparent powder, curing, spraying of a color transparent paint onto the hub, and curing, wherein:
   (1) in the step of spraying of the priming powder, the electrostatic spray gun is used for spraying, with the voltage controlled to be 60 KV and the powder output controlled to be 10 g/s, thereby guaranteeing excellent inter-coating adhesion;
   (2) in the step of curing of the priming powder, the surface temperature of the workpiece is controlled to be 180° C. for 8 min, thereby allowing the powder to maintain certain flexibility and better inter-coating adhesion;
   (3) in the step of spraying of the black paint, the air spray gun is used for spraying, with the air output controlled to be 50 cc/min and the sector atomization pressure being 2 bar, thereby guaranteeing the black paint to be sprayed onto the surface of the hub evenly and fully;
   (4) in the step of curing of the black paint, the temperature of the workpiece is controlled to be 150° C. for 10 min, thereby allowing the black paint to possess better flexibility and inter-coating adhesion;
   (5) in the step of machining and turning for glossy finish, the rotation speed S is controlled to be 1200 rpm, with the feed rate F controlled to be 0.2 mm/r;
   (6) in the step of spraying of the transparent powder, the electrostatic spray gun is used for spraying, with the voltage controlled to be 60 KV and the powder output controlled to be 10 g/s, thereby guaranteeing excellent inter-coating adhesion;
(7) in the step of curing of the transparent powder, the surface temperature of the workpiece is controlled to be 177° C. for 8 min, thereby allowing the powder to maintain certain flexibility and better inter-coating adhesion;
(8) in the step of spraying of the color transparent paint, the rotating-cup spray gun is used for spraying, with the rotation speed being 25000 R/min; and
(9) in the step of curing of the color transparent paint, the temperature of the workpiece is controlled to be 150° C. for 10 min, thereby allowing the color transparent paint to possess better flexibility and inter-coating adhesion.

2. A method for color register spraying of a hub, comprising the steps of: preprocessing, baking, spraying of priming powder on a surface of the hub, curing, spraying of a black paint, curing, machining and turning for glossy finish, preprocessing, baking, spraying of transparent powder, curing, spraying of a color transparent paint onto the hub, and curing, wherein:
(1) in the step of spraying of the priming powder, the electrostatic spray gun is used for spraying, with the voltage controlled to be 70 KV and the powder output controlled to be 12 g/s, thereby guaranteeing excellent inter-coating adhesion;
(2) in the step of curing of the priming powder, the surface temperature of the workpiece is controlled to be 180° C. for 10 min, thereby allowing the powder to maintain certain flexibility and better inter-coating adhesion;
(3) in the step of spraying of the black paint, the air spray gun is used for spraying, with the air output controlled to be 80 cc/min and the sector atomization pressure being 2.5 bar, thereby guaranteeing the black paint to be sprayed onto the surface of the hub evenly and fully;
(4) in the step of curing of the black paint, the temperature of the workpiece is controlled to be 150° C. for 12 min, thereby allowing the black paint to possess better flexibility and inter-coating adhesion;
(5) in the step of machining and turning for glossy finish, the rotation speed S is controlled to be 1200 rpm, with the feed rate F controlled to be 0.2 mm/r;
(6) in the step of spraying of the transparent powder, the electrostatic spray gun is used for spraying, with the voltage controlled to be 70 KV and the powder output controlled to be 12 g/s, thereby guaranteeing excellent inter-coating adhesion;
(7) in the step of curing of the transparent powder, the surface temperature of the workpiece is controlled to be 177° C. for 12 min, thereby allowing the powder to maintain certain flexibility and better inter-coating adhesion;
(8) in the step of spraying of the color transparent paint, the rotating-cup spray gun is used for spraying, with the rotation speed being 25000 R/min, the forming air pressure being 2.5 bar, and the paint spraying pressure being 4.5 bar, thereby guaranteeing the color transparent paint to be sprayed onto the surface of the hub evenly and fully; and
(9) in the step of curing of the color transparent paint, the temperature of the workpiece is controlled to be 150° C. for 12 min, thereby allowing the color transparent paint to possess better flexibility and inter-coating adhesion.

3. A method for color register spraying of a hub, comprising the steps of: preprocessing, baking, spraying of priming powder on a surface of the hub, curing, spraying of a black paint, curing, machining and turning for glossy finish, preprocessing, baking, spraying of transparent powder, curing, spraying of a color transparent paint onto the hub, and curing, wherein:
(1) in the step of spraying of the priming powder, the electrostatic spray gun is used for spraying, with the voltage controlled to be 80 KV and the powder output controlled to be 15 g/s, thereby guaranteeing excellent inter-coating adhesion;
(2) in the step of curing of the priming powder, the surface temperature of the workpiece is controlled to be 180° C. for 12 min, thereby allowing the powder to maintain certain flexibility and better inter-coating adhesion;
(3) in the step of spraying of the black paint, the air spray gun is used for spraying, with the air output controlled to be 100 cc/min and the sector atomization pressure being 3 bar, thereby guaranteeing the black paint to be sprayed onto the surface of the hub evenly and fully;
(4) in the step of curing of the black paint, the temperature of the workpiece is controlled to be 150° C. for 15 min, thereby allowing the black paint to possess better flexibility and inter-coating adhesion;
(5) in the step of machining and turning for glossy finish, the rotation speed S is controlled to be 1200 rpm, with the feed rate F controlled to be 0.2 mm/r;
(6) in the step of spraying of the transparent powder, the electrostatic spray gun is used for spraying, with the voltage controlled to be 80 KV and the powder output controlled to be 15 g/s, thereby guaranteeing excellent inter-coating adhesion;
(7) in the step of curing of the transparent powder, the surface temperature of the workpiece is controlled to be 177° C. for 15 min, thereby allowing the powder to maintain certain flexibility and better inter-coating adhesion;
(8) in the step of spraying of the color transparent paint, the rotating-cup spray gun is used for spraying, with the rotation speed being 25000 R/min, the forming air pressure being 3 bar, and the paint spraying pressure being 5 bar, thereby guaranteeing the color transparent paint to be sprayed onto the surface of the hub evenly and fully; and
(9) in the step of curing of the color transparent paint, the temperature of the workpiece is controlled to be 150° C. for 15 min, thereby allowing the color transparent paint to possess better flexibility and inter-coating adhesion.

\* \* \* \* \*